United States Patent
Dent

(10) Patent No.: US 8,345,793 B2
(45) Date of Patent: Jan. 1, 2013

(54) COMPENSATION OF DIAGONAL ISI IN OFDM SIGNALS

(75) Inventor: Paul Wilkinson Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1174 days.

(21) Appl. No.: 12/045,157

(22) Filed: Mar. 10, 2008

(65) Prior Publication Data

US 2009/0225899 A1    Sep. 10, 2009

(51) Int. Cl.
*H04L 25/03*         (2006.01)
(52) U.S. Cl. .................... 375/296; 375/260
(58) Field of Classification Search ............ 375/296, 375/260
See application file for complete search history.

(56) References Cited

U.S. PATENT DOCUMENTS

| | | | |
|---|---|---|---|
| 5,282,222 A | 1/1994 | Fattouche et al. | |
| 5,467,374 A | 11/1995 | Chennakeshu et al. | |
| 5,790,606 A | 8/1998 | Dent | |
| 5,910,182 A | 6/1999 | Dent et al. | |
| 6,148,041 A | 11/2000 | Dent | |
| 6,347,125 B1 | 2/2002 | Dent | |
| 6,570,910 B1 | 5/2003 | Bottomley et al. | |
| 7,103,106 B2 | 9/2006 | Park | |
| 7,248,648 B2 * | 7/2007 | Erving et al. | 375/316 |
| 2003/0235255 A1 * | 12/2003 | Ketchum et al. | 375/285 |
| 2006/0153283 A1 | 7/2006 | Scharf et al. | |
| 2008/0219371 A1 * | 9/2008 | Hong et al. | 375/260 |

FOREIGN PATENT DOCUMENTS

| | | |
|---|---|---|
| WO | 02/060114 A2 | 8/2002 |
| WO | 03/047118 A2 | 6/2003 |

OTHER PUBLICATIONS

Sun, Yi, "Bandwidth-Efficient Wireless OFDM," IEEE Journal on Selected Areas in Communications, vol. 19, No. 11, Nov. 2001, pp. 2267-2278.

* cited by examiner

*Primary Examiner* — Kenneth Lam
*Assistant Examiner* — Michael Neff
(74) *Attorney, Agent, or Firm* — Coats & Bennett, P.L.L.C.

(57) ABSTRACT

A method and apparatus for compensating for ISI is described herein. A transmitter and receiver work together to develop pulse shaped OFDM symbols with reduced inter-channel ISI between pulse-shaped OFDM symbols transmitted on different sub-carriers at the same time, and inter-block ISI between pulse-shaped OFDM symbols transmitted on the same sub-carrier at different times. In addition, a pre-compensation element in the transmitter and/or a post-compensation element in the receiver compensate for diagonal ISI occurring between pulse-shaped OFDM symbols transmitted on different sub-carriers at different times.

31 Claims, 11 Drawing Sheets

COMPENSATION OF DIAGONAL ISI IN OFDM SIGNALS

BACKGROUND

The present invention generally relates to interference cancellation, and more particularly relates to cancelling inter-symbol interference in OFDM signals.

Orthogonal Frequency Division Multiplexing (OFDM) is a digital multi-carrier modulation scheme utilizing multiple closely-spaced, orthogonal sub-carrier frequencies. Each sub-carrier is modulated with a conventional modulation scheme (e.g., quadrature amplitude modulation) at a low symbol rate, maintaining data rates similar to conventional single-carrier modulation schemes in the same bandwidth. OFDMA allows several users to share the available bandwidth by allocating different sub-carriers to the different users, making the users orthogonal to one another. The allocation of sub-carriers may be dynamic, such as allocating a larger number of sub-carriers to users that have a larger amount of data to transmit. OFDM is deployed or planned for a variety of wireless systems, including IEEE 802.16 (WiMAX), some IEEE 802.11a/g wireless LANs (Wi-Fi), IEEE 802.20 Mobile Broadband Wireless Access (MBWA), and the like.

One challenge for OFDM involves inter-symbol interference (ISI). The presence of ISI in a signal received at a receiver interferes with the receiver's ability to recover the transmitted symbols from the received signal. One form of ISI comprises ISI between symbols transmitted on different sub-carriers at the same time (within the same OFDM block), referred to herein as inter-channel ISI. Inter-channel ISI occurs, e.g., when orthogonality between the sub-carriers is lost during transmission. Another form of ISI comprises ISI between symbols transmitted on the same sub-carrier at different times (between different OFDM blocks), referred to herein as inter-block ISI. Inter-block ISI occurs, e.g., when the transmitted symbols of one OFDM block spread in time and overlap with the transmitted symbols of another OFDM block.

Still another form of ISI, referred to herein as diagonal ISI, comprises a combination of both inter-channel and inter-block ISI, where ISI occurs between symbols transmitted on different sub-carriers at different times. Diagonal ISI has two primary components: forward diagonal ISI and reverse diagonal ISI. Forward diagonal ISI represents the effect of the combined inter-channel and inter-block ISI caused by past symbols on current symbols. Reverse diagonal ISI represents the effect of the combined inter-channel and inter-block ISI caused by future symbols on current symbols.

Wireless providers have expended significant effort in compensating for ISI in wireless OFDM systems. Some conventional systems use receiver processing techniques that collectively reduce inter-block, inter-channel, and diagonal ISI. However, such processing techniques are undesirably complex and typically require a significant amount of processing power.

In other systems, pre-filtering transmission symbols using a carefully selected pulse-shaping filter may reduce and possibly remove inter-channel and/or inter-block ISI. Such pre-filtering techniques are significantly simpler and require less power than previous ISI compensation techniques. For example, a pulse-shaping filter having Nyquist properties in the time or frequency domain may be used to reduce inter-block or inter-channel ISI, respectively. Filters with frequency-domain Nyquist properties reduce inter-channel ISI by controlling the spectral spread of the different sub-carrier symbols in the same OFDM block. An exemplary frequency domain Nyquist filter is defined by a function having a Fourier Transform with a root-raised cosine shape and a square with a raised cosine shape. Filters with time-domain Nyquist properties reduce inter-block ISI by controlling the time spread of the OFDM blocks. An exemplary time domain Nyquist filter comprises an isotropic orthogonal transform algorithm (IOTA) pulse, such as disclosed in U.S. Pat. No. 7,103,106, which is incorporated herein by reference.

Further, a pulse-shaping filter defined by a function with Nyquist properties in both the time and frequency domains may be used to simultaneously reduce inter-channel and inter-block ISI. Such filters simultaneously control the spectral and time spread. Exemplary functions that generate such pulse-shaping filters having Nyquist properties in both the time and frequency domains are described in U.S. Provisional Patent Application Ser. No. 60/924,673 to applicant filed 25 May 2007, which is incorporated in its entirety herein by reference. An exemplary function with Nyquist properties in both the time and frequency domains is a function having the Nyquist property in one domain, where the function is also its own Fourier Transform.

Even though Nyquist pulse-shaping filters reduce and/or remove inter-channel and/or inter-block ISI, such filters do not address diagonal ISI. As such, there remains a need for reducing diagonal ISI.

SUMMARY

The present invention uses pre-compensation and/or post-compensation to compensate for diagonal ISI. In one embodiment, the transmitter may use a diagonal ISI pre-compensation element to pre-compensate for diagonal ISI. For example, the diagonal ISI pre-compensation element may pre-compensate OFDM symbols for transmission to reduce at least a portion of the diagonal ISI in the OFDM symbols received at the receiver. The transmitter may further transmit the pre-compensated symbols by pulse-shaped OFDM using a pulse shape chosen to substantially reduce inter-block and/or inter-channel ISI in the symbols received by the receiver.

In another embodiment, the receiver may use a diagonal ISI post-compensation element to post-compensate for diagonal ISI. For example, the receiver may receive a signal from the transmitter and develop pulse-shaped OFDM symbols therefrom to substantially reduce at least one of inter-block and inter-channel ISI in the developed OFDM symbols. The diagonal ISI post-compensation element may further post-compensate the developed OFDM symbols to compensate for at least a portion of the diagonal ISI in the developed OFDM symbols.

In still another embodiment, the pre-compensation and post-compensation elements of the transmitter and receiver, respectively, may work jointly to compensate for the diagonal ISI. For this embodiment, the pre-compensation element may pre-compensate OFDM symbols for a first portion of the diagonal ISI, e.g., forward or reverse diagonal ISI, while the post-compensation element may post-compensate the developed OFDM symbols for the remaining diagonal ISI.

A variety of ISI compensation devices may be used at the transmitter and/or receiver to compensate for the diagonal ISI. In one embodiment, the pre-compensation and post-compensation elements may comprise a partial channel inverse equalizer; the post-compensation element may alternatively comprise a decision feedback equalizer (DFE). For example, a partial channel inverse equalizer in the transmitter may apply a partial channel inverse filter formed by IIR and/or FIR structures to transmission symbols to pre-compensate for the diagonal ISI. As a result, the diagonal ISI incurred during transmission is handled by the applied diagonal ISI pre-compensation, resulting in received symbols with substantially reduced diagonal ISI. Alternatively, the partial channel inverse filter may be applied at the receiver to post-compensate for diagonal ISI. In another embodiment, the function of the partial channel inverse filter may be divided between the pre-compensation element and the post-compensation element to jointly reduce diagonal IS. In yet another embodiment, the receiver may use a maximum likelihood sequence estimation algorithm to decode symbols while compensating for the residual diagonal ISI estimated to remain after any transmit or receive pre- or post-compensation to thereby avoid symbol degradation caused by the residual diagonal ISI.

The diagonal ISI compensation of the present invention advantageously compensates for the diagonal ISI remaining after the application of a time and frequency domain Nyquist pulse-shaping filter at the transmitter. This enables an OFDM wireless communication system to achieve full spectral efficiency while compensating for inter-block, inter-channel, and diagonal ISI. The overall solution provides significant complexity and power savings over traditional post-processing ISI compensation techniques. Further, the present invention provides a means for compensating for diagonal ISI even when inter-channel and/or inter-block ISI are present, e.g., when no Nyquist pulse-shape filter is used at the transmitter. For example, the MLSE solution may compensate for some diagonal ISI while concurrently compensating for some non-diagonal ISI.

DETAILED DESCRIPTION

Figure 1:
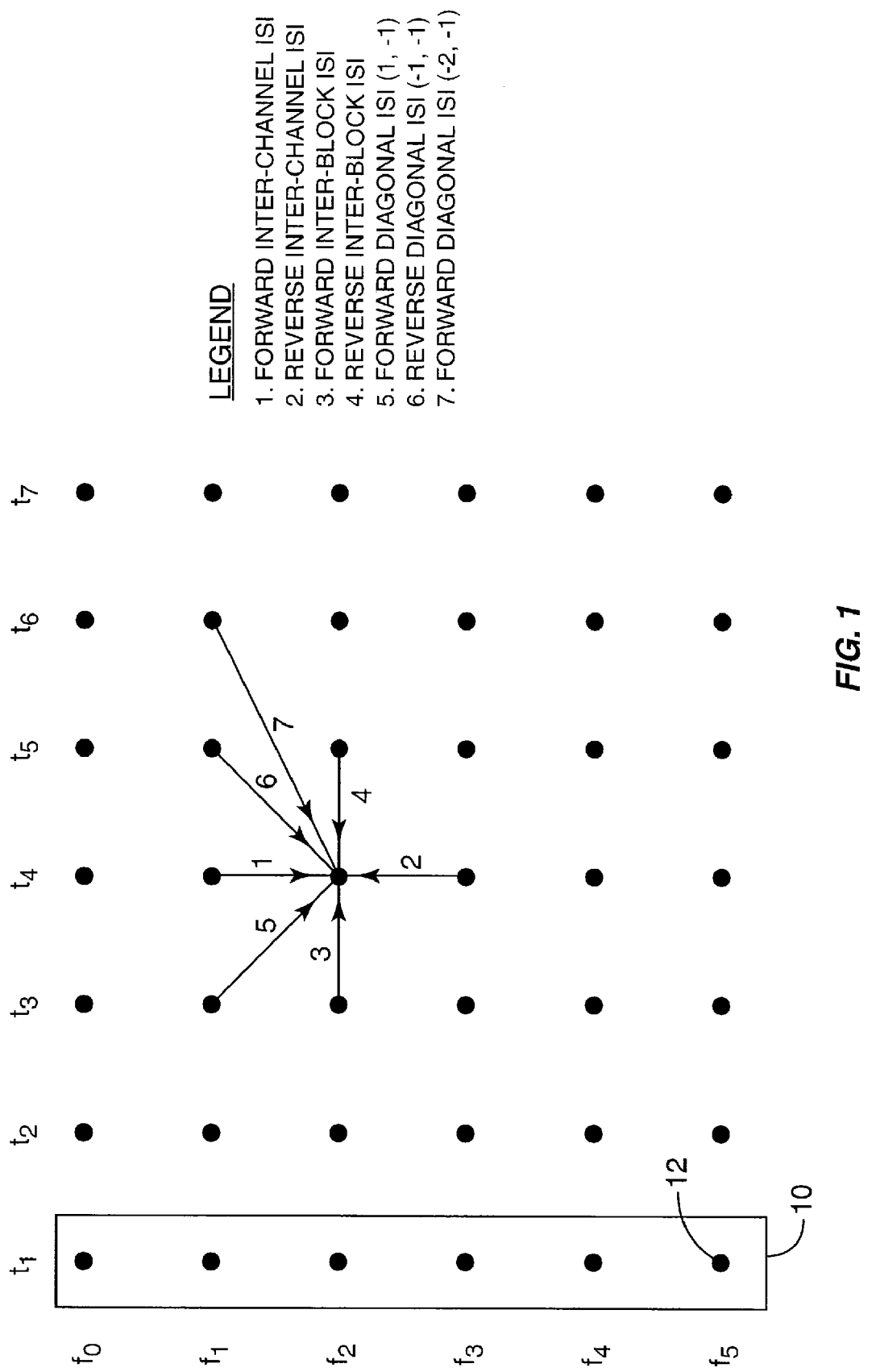
FIG. 1 shows a two-dimensional plane of OFDM symbols.

Inter-symbol interference (ISI) in transmitted OFDM symbols generally comprises a combination of inter-channel ISI, inter-block ISI, and diagonal ISI. FIG. 1 represents exemplary OFDM symbols 12 in a two-dimensional plane of frequency and time domains. Each instant of time ($t_k$) includes a block 10 of OFDM symbols 12 transmitted on different sub-carrier frequencies ($f_i$). Blocks 10 of symbols 12 in the frequency-time plane are shown with sub-carrier frequencies $f_0$, $f_1$, $f_2$, $f_3$, ... disposed vertically. FIG. 1 uses arrows to illustrate exemplary coupling between different symbol instances due to ISI with the symbol corresponding to sub-carrier frequency $f_2$ at time instant $t_4$. Arrows 1 and 2 show inter-channel ISI resulting from symbols transmitted on different sub-carrier frequencies ($f_1$ and $f_3$) at the same time ($t_4$). Arrows 3 and 4 show inter-block ISI between symbols transmitted on the same sub-carrier frequency ($f_2$) at different times ($t_3$ and $t_5$). Arrows 5, 6, and 7 show diagonal ISI between symbols transmitted on different sub-carrier frequencies at different times.

ISI that occurs between OFDM blocks 10, such as inter-block ISI and diagonal ISI may further be separated into forward and reverse ISI. ISI from "j" symbols removed in frequency and "k" symbols removed in time may be denoted by order (j,k), (−j,k), (j,−k), (−j,−k) with a "+" sign denoting ISI in the forward direction, and a "−" sign denoting ISI in the reverse direction. Forward ISI, denoted by (±j,k), represents the ISI on a current symbol caused by a symbol transmitted at an earlier time. Arrow 3 shows forward inter-block ISI denoted by (0, 1), while arrow 5 shows forward diagonal ISI denoted by (−1, 1). Reverse ISI, denoted by (±j,−k), represents the ISI on a current symbol caused by a symbol transmitted at a future time. Arrow 4 shows reverse inter-block ISI denoted by (0, −1), arrow 6 shows reverse diagonal ISI denoted by (−1, −1), and arrow 7 shows reverse diagonal ISI denoted by (−1, −2).

Some systems may pre-filter OFDM transmission symbols using a carefully selected pulse shape in a pulse-shaping filter and matched filter at the transmitter and receiver, respectively, to reduce and/or prevent inter-channel and/or inter-block ISI. For example, a pulse-shape having Nyquist properties in the time or frequency domain may be used to reduce inter-block or inter-channel ISI, respectively. Filters with frequency-domain Nyquist properties prevent inter-channel ISI by controlling the spectral spread of the different sub-carrier symbols in the same OFDM block, while filters with time-domain Nyquist properties prevent inter-block ISI by controlling the time spread of the OFDM blocks.

Figure 2:
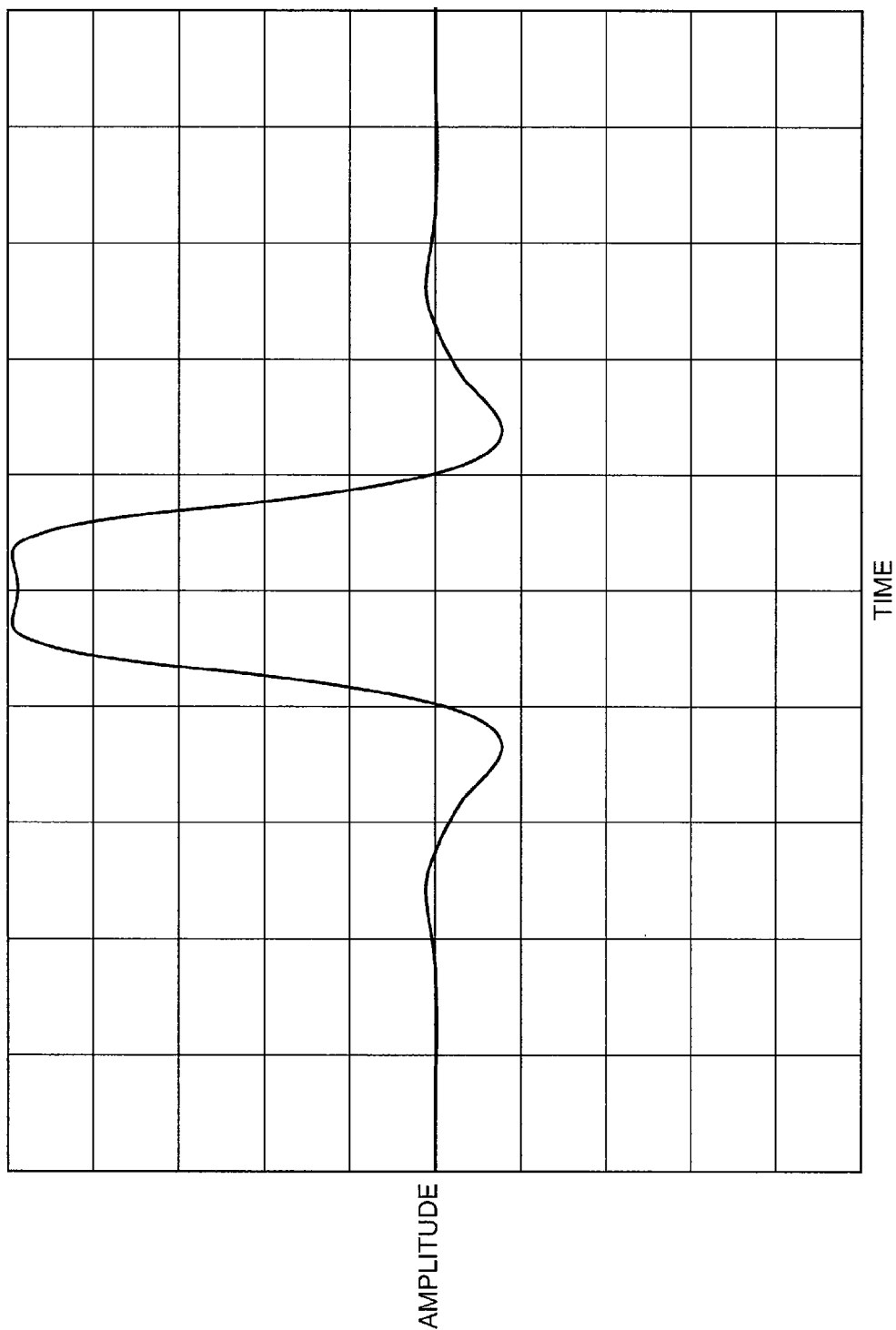
FIG. 2 shows an exemplary pulse-shape filter having Nyquist properties in the time and frequency domain.

U.S. Provisional Patent Application Ser. No. 60/924,673 to applicant filed 25 May 2007 provides pulse-shaping filters defined by a function having Nyquist properties in both the time and frequency domains. Such filters may be used to simultaneously prevent inter-channel and inter-block ISI. FIG. 2 shows an exemplary pulse shape for such a pulse-shaping filter. The illustrated pulse shape prevents inter-channel and inter-block ISI. However, such pulse-shaping filters do not prevent diagonal ISI between symbols transmitted on different sub-carrier frequencies at different times.

Because choice of pulse shape alone cannot compensate for all ISI, the present invention provides a supplementary operation to compensate for ISI not handled by pulse-shaped OFDM, e.g., diagonal ISI between symbols transmitted on different frequencies at different times. In some embodiments, the diagonal ISI compensation occurs separately from the pulse-shaped ISI compensation for non-diagonal ISI, e.g., inter-channel and inter-block ISI.

Figure 3:
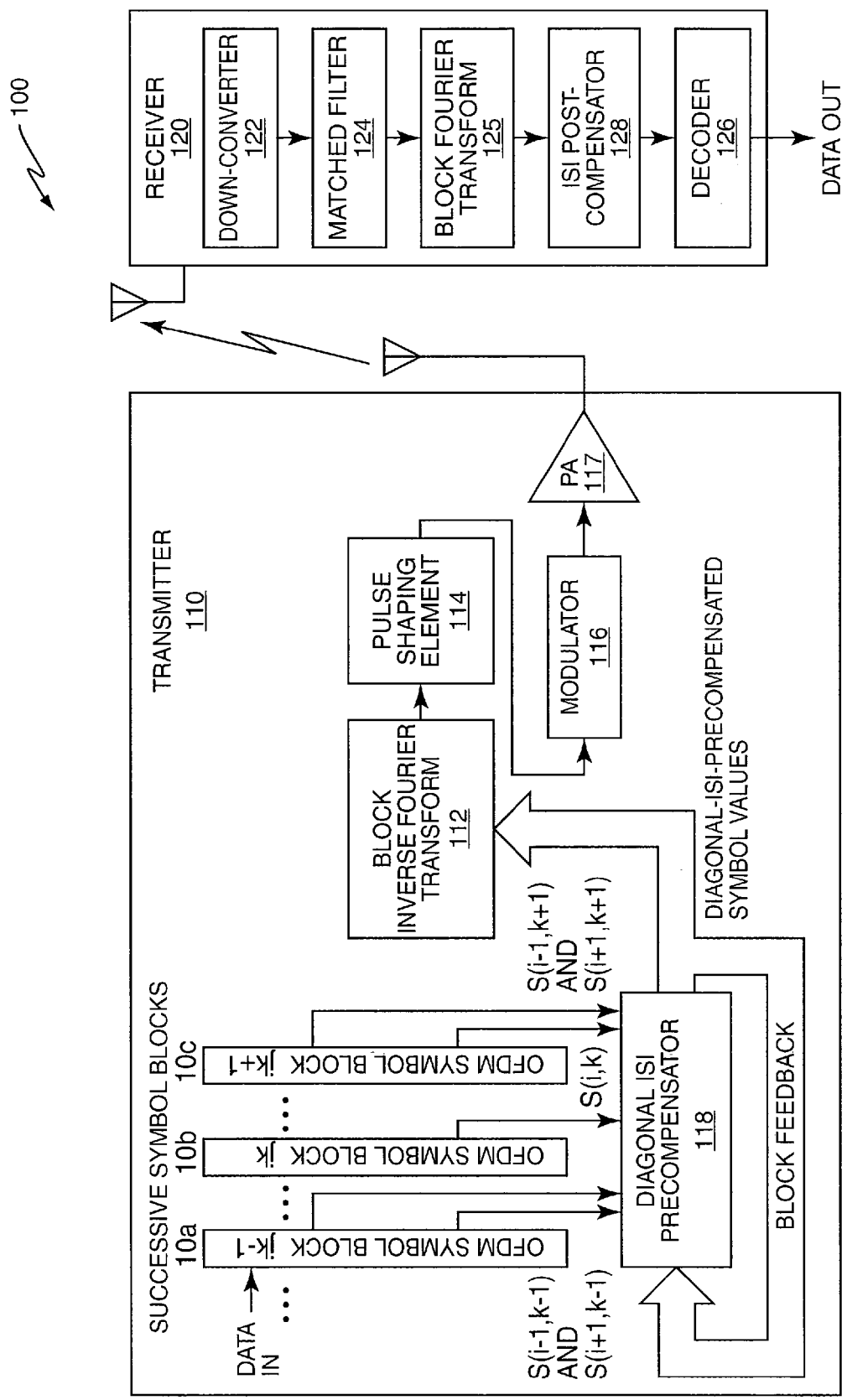
FIG. 3 shows a block diagram for an exemplary wireless communication system according to the present invention.

Supplementary diagonal ISI compensation may occur at the transmitter, the receiver, or at both the transmitter and receiver, as discussed in further detail below. FIG. 3 shows an exemplary OFDM communication system 100 comprising a transmitter 110 and a receiver 120. Transmitter 110 receives data symbols for transmission and groups them into OFDM symbol blocks 10a, 10b, 10c. The OFDM symbol blocks 10a, 10b, 10c may comprise any desired number of symbols, such as a power of two, e.g., 1024 symbols. Transmitter 110 includes a block inverse Fourier transform element 112, a pulse shaping element 114, a modulator 116, and a power amplifier 117. Block inverse Fourier transform element 112 converts successive OFDM symbol blocks to a time waveform of OFDM symbols, where each symbol of the block is modulated on its own sub-carrier frequency within the total bandwidth. Pulse shaping element 114 combines successive blocks with a pulse shape filter function comprising any desired pulse shape to generate pulse-shaped OFDM time samples for transmission. Modulator 116 uses the pulse-shaped OFDM time samples to modulate a give carrier frequency, and amplifier 117 amplifies the modulated carrier signal to a transmit power level to transmit the signal to receiver 120.

The receiver 120 receives the pulse-shaped OFDM symbols transmitted by the transmitter 110. Receiver 120 comprises a down-converter 122, matched filer 124, block Fourier transform element 125, and decoder 126 to receive and process the transmitted signal. Down-converter 122 down-converts the received signal by inverting the process applied by modulator 116. Blocks of down-converted samples are then collected and submitted to matched filter 124. Matched filter 124 matches the pulse-shape of pulse shaping element 114 and provides the resulting output to block Fourier transform element 125. More generally, the convolution of the transmit pulse shaping provided by the pulse shaping element 114 and the receive bock matched filtering provided by the matched filter 124 should result in an overall Nyquist filtering in both the frequency and time domains. Thus, it is common to choose identical transmit and receive pulse shaping functions, which are each the square root of a Nyquist function. However, this is not essential so long as their combination has the preferred Nyquist property. The block Fourier transform element 125 converts the filtered signal to OFDM symbols, which are decoded by decoder 126. While not shown, decoder 126 may include an error correction decoder for decoding symbols that were error-correction encoded by an encoder (not shown) before being input to transmitter 110.

Pulse shaping element 114 and matched filter 124 may work together to compensate for some ISI, e.g., inter-block and/or inter-channel ISI, using a predetermined pulse-shape. The pulse shaping element 114 weights repeats of previous and future OFDM symbol blocks to overlap a current OFDM symbol block, which is also weighted. Pulse shaping element 114 weights each OFDM symbol block, which may be considered as repeated indefinitely, such that the amplitude of the weighted OFDM symbol blocks tail off over the repeated OFDM symbol blocks according to the pulse shape. Thus, previous and future OFDM symbol blocks, weighted by the tails of the pulse-shape are added to the current OFDM symbol block weighted by the main lobe of the pulse-shape. The pulse shape applied by the pulse shaping element 114 is preferably a root-Nyquist pulse shape, where the Nyquist pulse shape is also its own Fourier transform.

Figure 6:
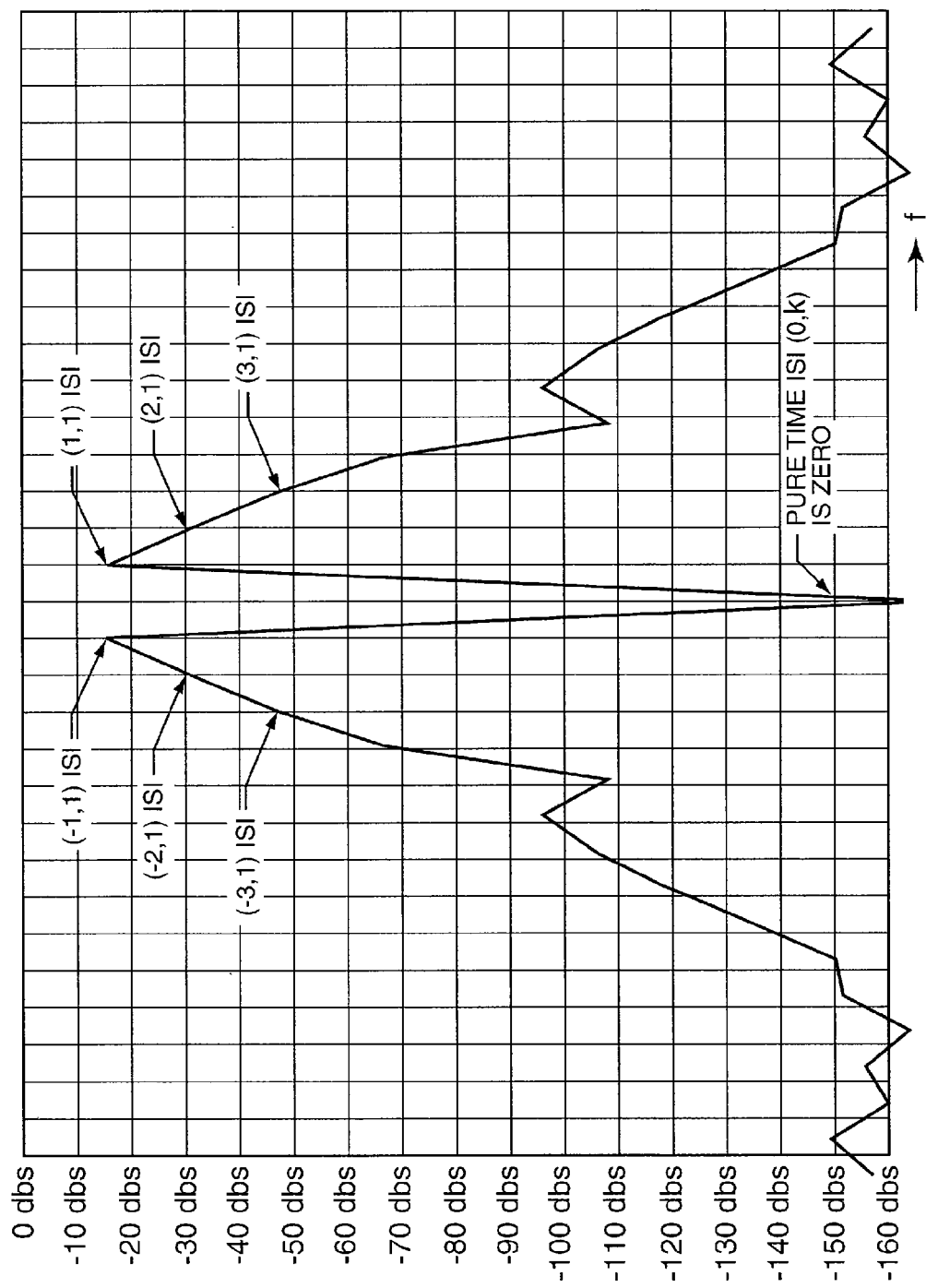
FIG. 6 shows an exemplary plot of the diagonal ISI vs. frequency.
Figure 7:
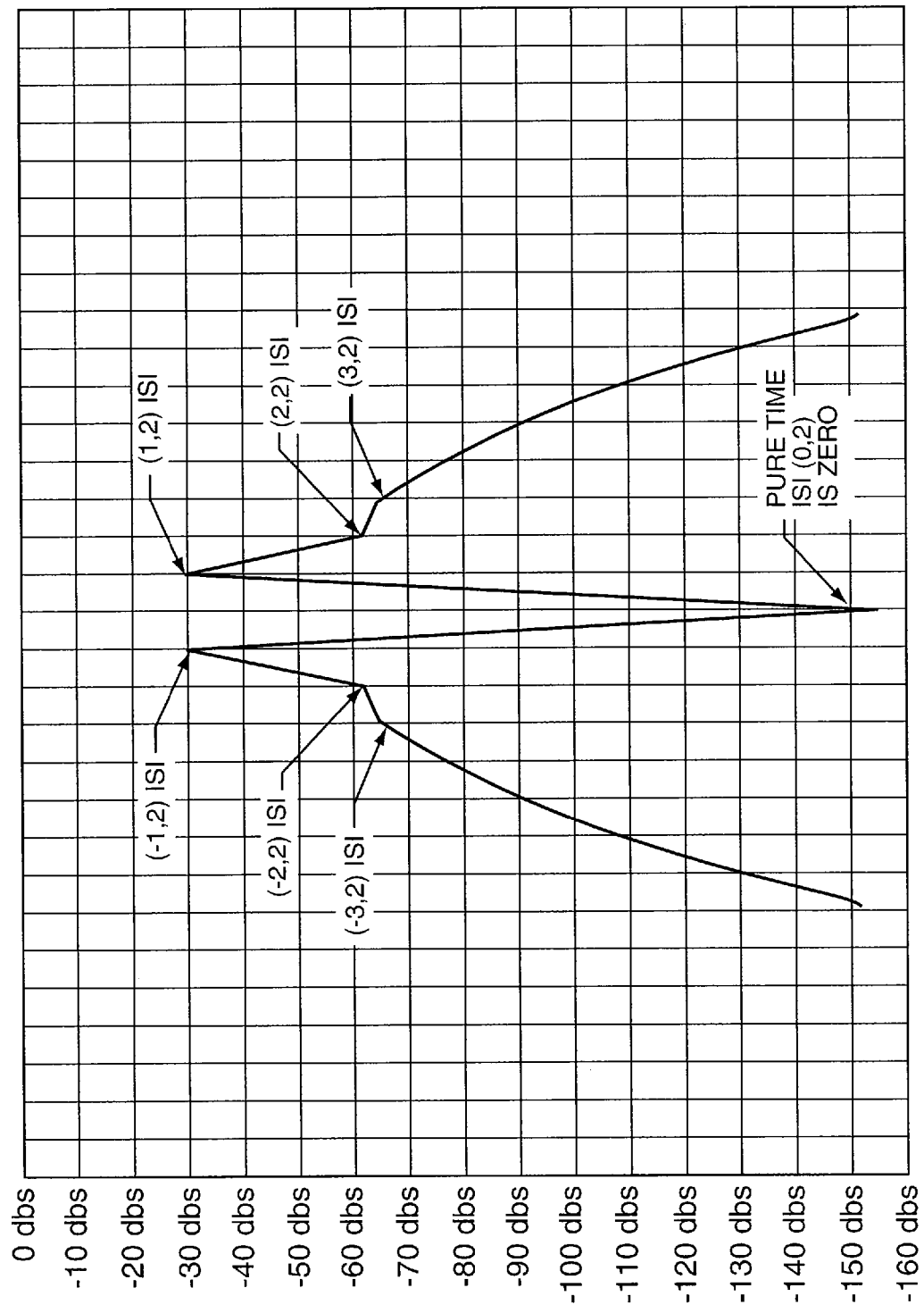
FIG. 7 shows another exemplary plot of the diagonal ISI vs. frequency.

The pulse shape may preferably comprise a root-Nyquist pulse shape, where the Nyquist pulse shape is also its own Fourier transform, such as the pulse-shape shown in FIG. 2. When both the pulse-shaping element 114 and the matched filter 124 use the same pulse shape, e.g., a root Nyquist pulse shape, the output of the matched filter 124 comprises sample values from the current symbol block combined with sample values from previous and future symbol blocks according to a pulse-shaping and weighting function. Due to the selection of the pulse-shape, the matched filter output exhibits no ISI along at least one of the frequency and time axes of the two-dimensional plane of data symbols. In some cases, such as when the Nyquist pulse shape is its own Fourier transform, the output of the matched filter 124 exhibits no ISI along both the frequency and time axes. For example, when both the pulse shaping element 114 and the matched filter 124 use, e.g., the pulse shape of FIG. 2, the sample values output by the matched filter 124 comprise the current symbol block combined with previous and future symbol blocks according to the pulse-shaping Nyquist weighting function. For this example, the resulting sample values associated with the current symbol block appear with a flat weighting across the current symbol block, as it originally had at the input of the pulse shaping element 114. Further, the resulting sample values associated with previous and future symbol blocks appear weighted with a function whose integral over the symbol block is zero. The net flat weighting across the current symbol block means the current OFDM symbol block has no inter-channel ISI. The zero integral weighting across the previous and future symbol blocks means that the ISI between a sub-carrier frequency of one block to the same sub-carrier frequency of another block is zero, and therefore, that the received symbols do not have inter-block ISI. Thus, the combination of the pulse shaping element 114 and the matched filter 124 may remove inter-channel and inter-block ISI, leaving only diagonal ISI from different sub-carriers at different times in the output of the matched filter 124. The magnitude of such diagonal ISI is proportional to the integral of the adjacent block net weighting functions multiplied by a sine wave of duration one cycle over the block for diagonal ISI one sub-channel removed, two cycles for diagonal ISI two sub-channels removed, etc. FIGS. 6 and 7, discussed further below, show diagonal ISI for one and two time blocks of separation, respectively and for various frequency channel separations when the pulse shaping element 114 and matched filter 124 use the pulse shape of FIG. 2.

To address diagonal ISI, transmitter 110 and/or receiver 120 may further include diagonal ISI compensation elements 118, 128. The compensation elements 118, 128 pre-compensate and/or post-compensates for the diagonal ISI such that diagonal ISI compensation occurs before decoder 126. The compensation elements 118, 128 may compensate for any portion of the diagonal ISI, e.g., the diagonal ISI occurring along a single diagonal in the two-dimensional plane of FIG. 1, all diagonal ISI, the diagonal ISI from a past symbol block to a future symbol block (forward diagonal ISI), the diagonal ISI from a future symbol block to the current symbol block (reverse diagonal ISI), etc.

More particularly, the present invention compensates for diagonal ISI using a pre-compensator 118 at the transmitter 110, using a post-compensator 128 at the receiver 120, or using some combination of both the pre-compensator 118 and the post-compensator 128. In one example, pre-compensator 118 combines a current symbol block with a previously pre-compensated and transmitted block of symbols fed back from its own output to pre-compensate for forward ISI that arises during transmission when a previously transmitted symbol block affects the current symbol block. In another example, pre-compensator 118 may use a future symbol block, e.g., block 10a, to compensate a current symbol block, e.g., block 10b, for diagonal ISI that will occur due to the future symbol block. It will be appreciated that pre-compensator 118 may comprise a block IIR or FIR filter that uses feedback of previously output blocks to implement an IIR characteristic or uses previous or future symbol blocks to implement the FIR characteristic, respectively, if needed. Other pre-compensation and post-compensation techniques are discussed in further detail below.

Figure 4:
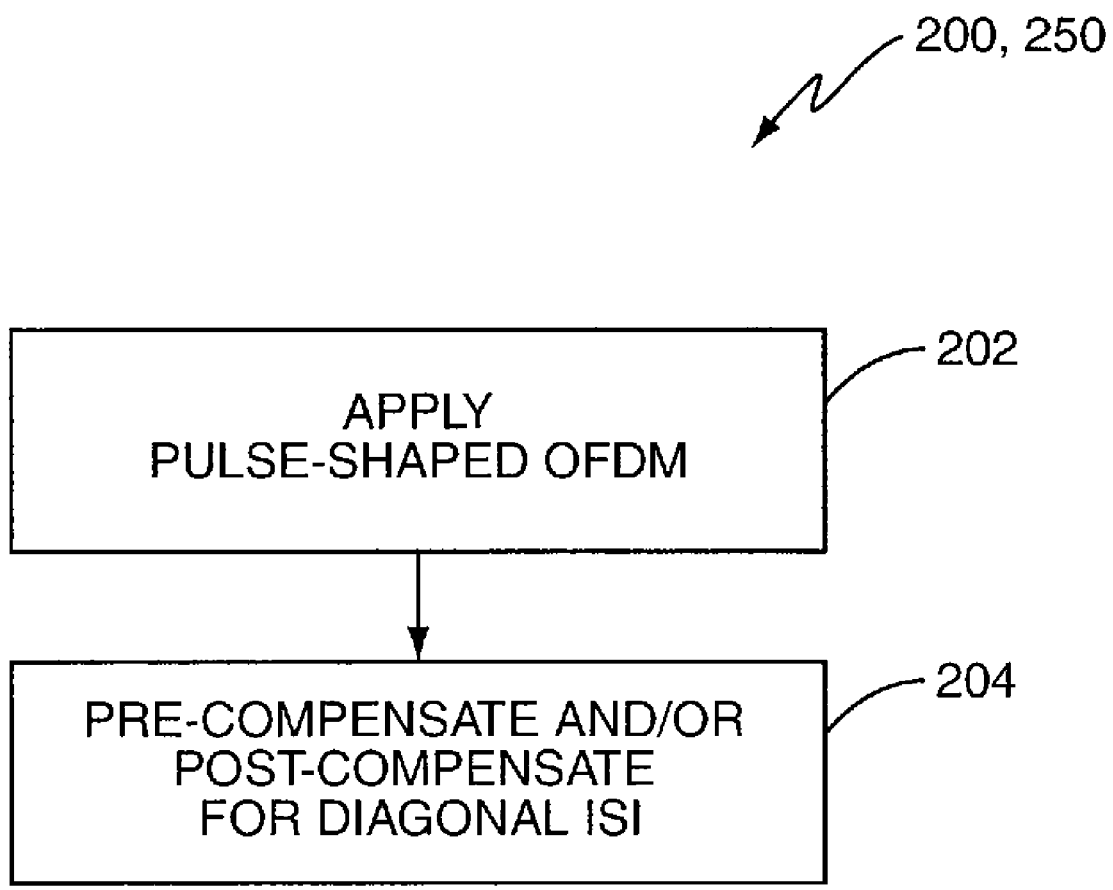
FIG. 4 shows an exemplary diagonal ISI compensation process according to the present invention.
Figure 5A:
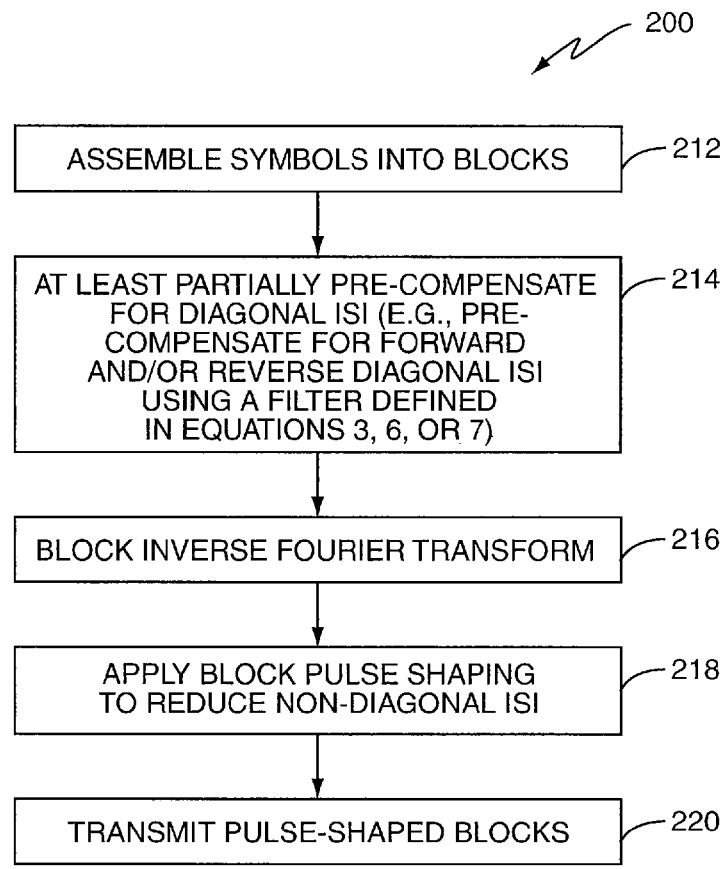
FIGS. 5a and 5b show an exemplary diagonal ISI compensation process for a transmitter and receiver, respectively, according to the present invention.
Figure 5B:
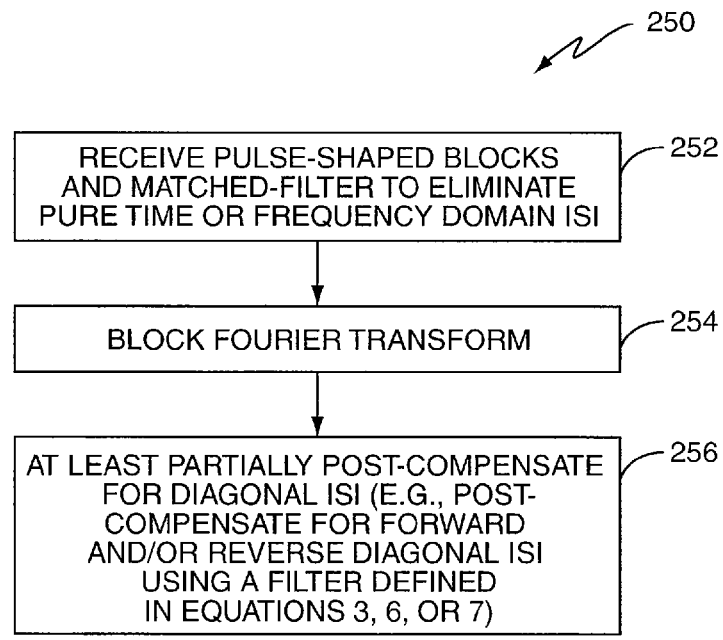

FIGS. 4, 5a, and 5b show an exemplary transmitter process 200 and receiver process 250, respectively, for compensating for ISI according to the present invention. In general, transmitter 110 and receiver 120 use pulse shaping element 114 and matched filter 124, respectively, to implement pulse-shaped OFDM to substantially reduce at least one of inter-block and inter-channel ISI in the OFDM symbols received at the receiver 120 (block 202). Pre-compensator 118 and/or post-compensator 128 compensate for the diagonal ISI (block 204). When the ISI pre-compensator 118 and the ISI post-compensator 128 work together to compensate for diagonal ISI, the ISI pre-compensator 118 may pre-compensate for a first portion of the diagonal ISI, such as the forward diagonal ISI, while the ISI post-compensator 128 may compensate for a remaining portion of the diagonal ISI, such as the reverse diagonal ISI, from the received OFDM symbols. Alternatively, pre-compensator 118 may compensate for diagonal ISI along one diagonal, while post-compensator 128 may compensate for diagonal ISI along another diagonal.

The exemplary transmitter process 200 of FIG. 5a assembles symbols for transmission into OFDM symbol blocks 10 (block 212). Pre-compensator 118 at least partially compensates for diagonal ISI (block 214) before outputting the compensated symbol blocks to block inverse Fourier transform element 112. Block inverse Fourier transform element 112 takes the inverse Fourier transform of the diagonal ISI compensated OFDM symbol blocks to generate the time waveform of OFDM symbols (block 216). Pulse shaping element 114 implements the pulse-shaping and weighting function described herein to reduce non-diagonal ISI (block 218). The resulting signal is modulated and amplified for transmission to receiver 120 (block 220). The exemplary receiver process 250 of FIG. 5b receives and down-converts the pulse-shaped OFDM symbol blocks. The matched filter 124 applies a pulse-shaping and weighting function to the down-converted OFDM symbol blocks to complete the non-diagonal ISI reduction process (block 252). The block Fourier transform element 125 converts the filtered signal to OFDM symbols (block 254). Post-compensator 128 compensates for the diagonal ISI remaining in the OFDM symbols output by the block Fourier transform element 125 (block 256). It will be appreciated that if all diagonal ISI compensation occurs in the transmitter 110, block 256 will be eliminated from the receiver process 250, and if all diagonal ISI compensation occurs in the receiver 120, block 204 will be eliminated from the transmitter process 200. Further, it will be appreciated that the processes 200, 250 of FIGS. 5a and 5b are provided for illustrative purposed, and therefore, do not limit the present invention.

The ISI pre-compensator 118 and/or the ISI post-compensator 128 may be designed using the expected amount of diagonal ISI present in an OFDM symbol after pulse-shaped OFDM using a pulse shape having Nyquist properties in both the time and frequency domains, e.g., the pulse shape of FIG. 2. The design may be achieved by:
1. Multiplying the pulse by itself shifted in time by k block periods to get a cross-product.
2. Segmenting the cross product into segments having a length of one block period, folding all the segments on top of each other, and combining the folded segments by addition to obtain the folded cross product having a length of one block period.
3. Taking the Fourier transform of the folded cross product to obtain the expected ISI for all frequency shifts j for the given block time shift k to obtain the expected diagonal ISI of order (j, k) for given k and all j.

A Discrete or Fast Fourier Transform may be used if points spaced only at integer multiples of the sub-carrier spacing are required, where the sub-carrier spacing is the reciprocal of the symbol period.

FIG. 6 shows the result when the above process is applied to the pulse of FIG. 2 for k=1 (or −1). As shown by FIG. 6, the diagonal ISI is approximately −15 dB for symbols removed by one sub-carrier and one symbol period, e.g., (1, 1) diagonal ISI, and falls to below −30 dB for symbols further removed in frequency. Generally, ISI of −30 dB or below is sufficiently small to be ignored. Computing the ISI for k=2 also shows that all ISI of order (j, 2) falls below −30 dB and may thus be already sufficiently low, as shown by FIG. 7. Thus, for the pulse shape of FIG. 2, only the (1, 1) diagonal ISI has a magnitude that may require diagonal ISI compensation.

Equation (1) shows a mathematical expression for the symbol output by a matched filter at the receiver 120, taking into account only the (1, 1) diagonal ISI terms.

$$R(j,k)=S(j,k)+A[S(j-1,k-1)+S(j+1,k-1)+S(j-1,k+1)+S(j+1,k+1)] \quad (1)$$

In Equation (1), A represents a diagonal ISI coupling factor, which is the same for symmetrical pulses for both forward and reverse directions, and was computed to be −0.17391 for the pulse shape of FIG. 2. In this expression, any gain or phase shift in the channel from transmitter 110 to receiver 120 has been ignored, e.g., assumed to have been made unity by amplification and phase rotation provided by the transmitter 110 and receiver 120. Defining Z to be a time-shift operator of one symbol period, and z to be a frequency shift operator of one sub-carrier spacing, we may also write Equation (1) as:

$$R(z,Z)=S(z,Z)[1+A(z+1/z)(Z+1/Z)], \quad (2)$$

where $[1+A(z+1/z)(Z+1/Z)]$ represents diagonal ISI. When diagonal ISI is not present, $R(j,k)=S(j,k)$. Thus, it is desirable to compensate for the factor $[1+A(z+1/z)(Z+1/Z)]$ either by the transmitter 110, by the receiver 120, or by a combination of both the transmitter 110 and the receiver 120.

Pre-compensator 118 operates on successive OFDM symbol blocks 10a, 10b, 10c and/or previously processed OFDM symbol blocks to generate pre-compensated OFDM symbols for the symbols in the current block. In one embodiment, the ISI pre-compensator 118 may comprise a partial channel inverse equalizer that pre-compensates for diagonal ISI by filtering the OFDM symbols for transmission S(z,Z) using a filter defined by $[1+A(z+1/z)(Z+1/Z)]^{-1}$. For this embodiment, the ISI pre-compensator 118 outputs OFDM symbols for transmission T(z,Z) given by:

$$T(z, Z) = \frac{S(z, Z)}{1 + A(z + 1/z)(Z + 1/Z)}. \quad (3)$$

The function $[1+A(z+1/z)(Z+1/Z)]^{-1}$ may be expanded to:

$$[1 + A(z + 1/z)(Z + 1/Z)]^{-1} = (1 - A(z + 1/z)(Z + 1/Z)) \quad (4)$$
$$(1 + A^2(z + 1/z)^2(Z + 1/Z)^2)$$
$$= (1 + 4A^2)(1 + 36A^4)$$
$$(1 + 4900A^8)\ldots$$
$$(1 - A(z + 1/z)(Z + 1/Z))$$

When A=−0.17391, for example, the constant multiplier of Equation (4) equals 1.163, which equates to 1.31 dB. This means that a current OFDM symbol should be transmitted 1.31 dB higher in power, and also combined with the four diagonally surrounding symbols prior to transmission to pre-compensate for the diagonal ISI. The latter requires an extra 0.5 dB of transmit power also, for a total transmission power increase of 1.81 dB. Thus, pre-compensating for diagonal ISI entirely at the transmitter 110 using a partial channel inverse equalizer requires increasing the transmission power by 1.81 dB for the exemplary pulse of FIG. 2 as compared to a hypothetical optimum case of a pulse having no diagonal ISI.

At the other end, the ISI post-compensator 128 may comprise a partial channel inverse equalizer that compensates for the diagonal ISI entirely at the receiver 120. In this case, the ISI post-compensator 128 filters the received OFDM symbols using a filter defined by $[1+A(z+1/z)(Z+1/Z)]^{-1}$. If the diagonal ISI factor $[1+A(z+1/z)(Z+1/Z)]$ computed when $A=-0.17391$ is applied at the receiver 120 to the received OFDM symbols $R(z,Z)$, the noise in the received symbols will be magnified by the 1.163 multiplier as well as by a noise contribution from each of the four diagonal ISI values, resulting in the same total loss of 1.81 dB as if transmit pre-compensation had been employed.

In still another embodiment, the ISI pre-compensator 118 may pre-compensate for a portion of the diagonal ISI, and the ISI post-compensator 128 may compensate for the residual portion of the diagonal ISI. For example, Equation (2) may be rewritten as:

$$R(z,Z)-AZ^{-1}(z+1/z)S(z,Z)=S(z,Z)[1+AZ(z+1/z)], \quad (5)$$

where $AZ^{-1}(z+1/z)$ represents forward diagonal ISI ($ISI_F$), and $[1+AZ(z+1/z)]$ represents reverse diagonal ISI ($ISI_R$). ISI pre-compensator 118 may, for example, pre-compensate for the reverse diagonal ISI by filtering OFDM symbols for transmission according to:

$$T(z,Z) = S(z,Z)\frac{1+AZ^{-1}(z+1/z)}{1+A(z+1/z)(Z+1/Z)} \quad (6)$$
$$= S(z,Z)\left[1-\frac{AZ(z+1/z)}{1+A(z+1/z)(Z+1/Z)}\right]$$

The ISI post-compensator 128 may compensate for the residual diagonal ISI, for example, by compensating for the forward diagonal ISI. In another example, ISI pre-compensator 118 may pre-compensate for the forward diagonal ISI by filtering OFDM symbols for transmission according to:

$$T(z,Z) = S(z,Z)\frac{1+AZ(z+1/z)}{1+A(z+1/z)(Z+1/Z)} \quad (7)$$

For this example, the ISI post-compensator 128 may compensate for the residual diagonal ISI, for example, by compensating for the reverse diagonal ISI.

It will be appreciated that the diagonal ISI compensation may be achieved by other means than just a partial channel inverse equalizer. For example, the ISI post-compensator 128 in receiver 120 may comprise a decision feedback equalizer (DFE), which makes hard decisions on equalized symbols, and which uses hard decisions made on previously received symbols to compensate for diagonal ISI in current symbols. Assuming the hard decisions are mostly correct, a DFE implementation may be used to compensate for the noise contribution from at least the forward diagonal SI.

The DFE implementation may be obtained by re-writing Equation (5) as:

$$R(z,Z)-AZ^{-1}(z+1/z)S_d(z,Z)=S(z,Z)[1+AZ(z+1/z)], \quad (8)$$

where $S_d$ refers to hard symbol decisions. Due to the $Z^{-1}$ term, the hard symbol decisions $S_d$ are only needed for the decoded OFDM block of symbols from the previous time instant. If the receiver 120 also employs error correction decoding, and if the error correction decoding improves the accuracy and/or certainty of some of the decoded symbols, $S_d$ may comprise the more accurate/certain symbols. For example, the error correction decoding may process soft-symbols to obtain hard decisions for decoded symbols. The decoded symbols may then be re-encoded to produce the symbols $S_d$ for Equation (8). When error correction decoding is employed, the method of multi-pass decoding may also be used, in which decoded symbols are used to reconstruct some of the symbols $S_d$ used in Equation (8), in order to improve diagonal ISI compensation for symbols S remaining to be decoded. Even already resolved symbols S may be compensated again and submitted to error correction decoding again, and this iterative process may be repeated as many times as simulations determine to be valuable.

When a DFE implementation is used to compensate for forward diagonal ISI at the receiver 120, only the reverse diagonal ISI $[1+AZ(z+1/z)]$ shown on the right-hand-side of Equation (8) remains. DFE cannot compensate for the reverse diagonal ISI because the reverse diagonal ISI involves future symbols that are not as yet available as hard decisions. Thus, in one embodiment, the ISI post-compensator 128 may further include a partial channel inverse equalizer that applies the inverse factor $[1+AZ(z+1/z)]^{-1}$ to either the received symbols before DFE processing or to the post-DFE processed symbols to handle the reverse diagonal ISI.

Alternatively, the ISI pre-compensator 118 at the transmitter 110 may comprise a partial channel inverse equalizer to partially compensate the OFDM symbols before transmission for the reverse diagonal ISI. For example, transmitting the OFDM symbols defined by Equation (6), pre-compensates for the reverse diagonal ISI at the transmitter 110, while using the above-described DFE process compensates for the forward diagonal ISI at the receiver 120. With this implementation, it may be found that the constant term for Equation (4) changes to $1+2A^2+18A^4=1.076$, which equates to 0.64 dB. The need to add future symbols into the transmission increases the transmit power by an amount which may be determined by adding the squares of the amplitudes of the future symbols in the above expansion, resulting in a further increase in transmit power of approximately 0.3 dB for the exemplary pulse-shaping filter of FIG. 2. Thus, the total power increase is 0.94 dB. The 0.94 dB power difference also represents the noise increase that occurs if a partial channel inverse equalizer is applied by the ISI post-compensator 128 to cancel the reverse diagonal ISI at the receiver 120. In either case, the 0.94 dB represents a significant improvement over the 1.81 dB transmission power increase and/or noise increase provided by the partial channel inverse equalizer that addresses both forward and reverse diagonal ISI. Thus, compensating for forward diagonal ISI at the receiver 120 using DFE and compensating for reverse diagonal ISI using a partial channel inverse equalizer either at the transmitter 110 or at the receiver 120 substantially improves the impact of the diagonal ISI compensation techniques of the present invention on the transmitter 110.

Yet another alternative employs DFE plus a partial channel inverse equalizer at the receiver 120 for an initial decoding, with the resulting decoded symbols being used in a second pass decoding in which DFE compensates for both forward and reverse diagonal ISI. Thus, an iterative approach may be used wherein a future decoded block, now assumed to be noise and error free, is fed back to compensate reverse ISI, instead of using the partial channel inverse equalizer, in order to obtain an improved decoding of a previous block. Such a technique would be expected to significantly reduce the 0.94 dB transmission power increase/noise loss associated with the partial channel inverse equalizer solution.

To illustrate, consider the following example. Application of the partial channel inverse equalizer for reverse diagonal ISI at the transmitter 110 may be carried out by processing transmit OFDM symbol blocks 10 in time-reversed order. The pulse shaping element 114 applies a time and frequency domain Nyquist pulse-shaping filter, e.g., that of FIG. 2, to future symbol blocks as the current transmitted symbol block 10 is formed by weighted addition of the current symbol block 10 with, e.g., three past and three future symbol blocks 10. For this example, the time-shift operator Z may be replaced by attaching indices to T(z,Z) to indicate whether it is time shifted or not, e.g., $$T(z,Z)=T_k(z)$$

$$ZT_1(z)=T_{k+1}(z). \quad (9)$$

In the steady state, the ISI pre-compensator 118 may compute the value of the OFDM block 10 to be transmitted at instant k is $T_k(z)$ as follows:

1. Let $T_{k+3}=S(k+3)$, where S(k+3) represents the symbols to be transmitted at time instant k+3.
2. Calculate $U(z)=-A(z+1/z)S(k+4)$, where each U value depends on two S(k+4) values separated by plus and minus one sub-carrier spacing, respectively.
3. Add U(z) to $T_{k+3}$.
4. Replace each U-value with the sum of its neighbors, weighted by A again according to $U(z)=-A(z+1/z)U(z)$.
5. Add U(z) to $T_{k+2}$.
6. Repeat step 4 again.
7. Add U(z) to $T_{k+1}$.
8. Repeat step 4 again.
9. Add U(z) to $T_k$.

The resulting OFDM $T_k(z)$ is thereby pre-compensated for reverse diagonal ISI and may be Inverse Fourier Transformed to obtain a block of time samples. The block of time samples for instant k is combined using a pulse-shaping filter, e.g., the pulse-shaping filter of FIG. 2, as a weighting function with past and future blocks for transmission. If three past and future OFDM blocks are used (e.g., the pulse of FIG. 2 is truncated to seven symbols in length), then as soon as the time samples for block $T_k(z)$ are available, the transmit signal samples for instant (k−3) may be completed.

Alternatively, the partially complete blocks $T_{k+3}$, $T_{k+2}$ and $T_{k+1}$ calculated in steps 1 to 9 may be Fourier transformed and used in weighted combination with the complete $T_k$ to ready an earlier transmission for instant (k). Thus, latency may be reduced at the expense of the small approximation involved in using partially-accurate future blocks in the tails of the pulse for instant $T_k$. Because each pre-compensated block $T_k$, $T_{k+1}$, etc., will also now be Fourier Transformed at different stages of their calculation, there is a also a cost in performing more Fourier Transforms.

Figure 8A:
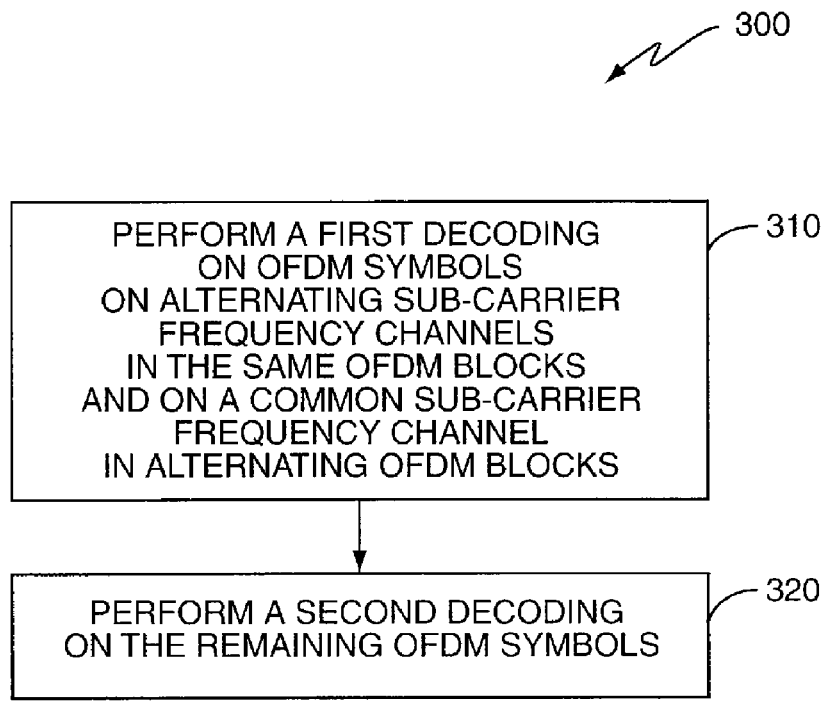
FIGS. 8a and 8b shows exemplary MLSE compensation processes according to the present invention.
Figure 8B:
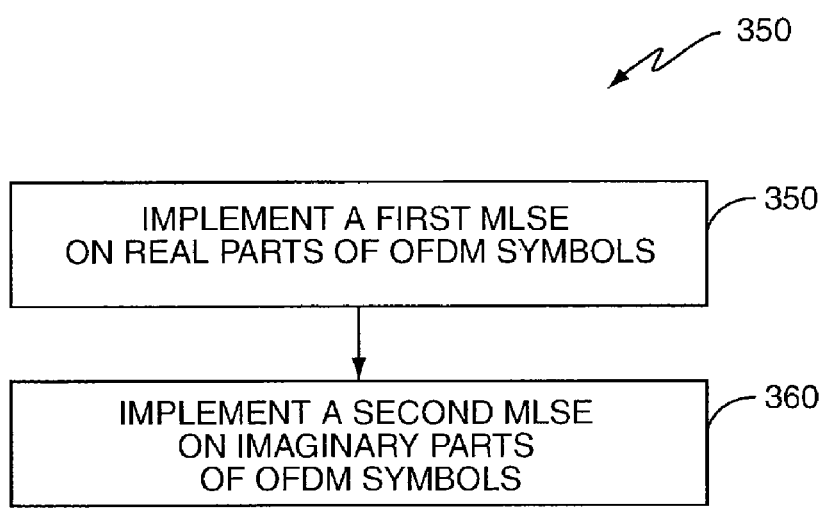

In another exemplary embodiment, the diagonal ISI compensation may be achieved when the ISI post-compensator 128 and/or decoder 126 uses a maximum likelihood sequence estimation (MLSE) algorithm. MLSE may be used to separately compensate for real and imaginary parts of diagonal ISI at the receiver 120. Further, MLSE may be used to reduce the complexity of the diagonal ISI process. FIG. 8a shows one exemplary diagonal post-compensation process 300 using an MLSE algorithm. For this embodiment, the post-compensator 128 and/or decoder 126 perform a first decoding on developed OFDM symbols on alternating sub-carrier frequency channels in the same OFDM block, and on developed OFDM symbols on a common sub-carrier frequency channel in alternating OFDM blocks (block 310). Subsequently, the post-compensator 128 and/or decoder 126 performs a second decoding on the remaining OFDM symbols (block 320). FIG. 8b shows another exemplary diagonal post-compensation process 350 using an MLSE algorithm. For this embodiment, the post-compensator 128 and/or decoder 126 implement a first MLSE process on real parts of developed OFDM symbols (block 360). Subsequently, the post-compensator 128 and/or decoder 126 implement a second MLSE process on imaginary parts of the developed OFDM symbols (block 370). The following describes the exemplary MLSE processes in more detail.

MLSE provides good diagonal ISI compensation for symbols signals affected by ISI along a 1-D sequence. U.S. Pat. Nos. 5,790,606 and 6,148,041 to current Applicant, which are hereby incorporated by reference herein, describe a form of MLSE for handling ISI among values of a 2-D signal distribution. However, the complexity of 2-D MLSE may become excessive unless there are features that regularly contract the state-space to prevent exponential growth. For example, known signal values or symbols that appear periodically in the 2-D signal sample value distribution may cause contraction of the state-space. In the above-incorporated '606 and '041 patents, a zero signal value was expected to pertain to 50% of the array positions 50% of the time. In an OFDM system, it is common to distribute known pilot symbols at regular intervals in the frequency/time plane, and these may be useful in contracting the state-space of a 2-D MLSE equalizer.

Figure 9:
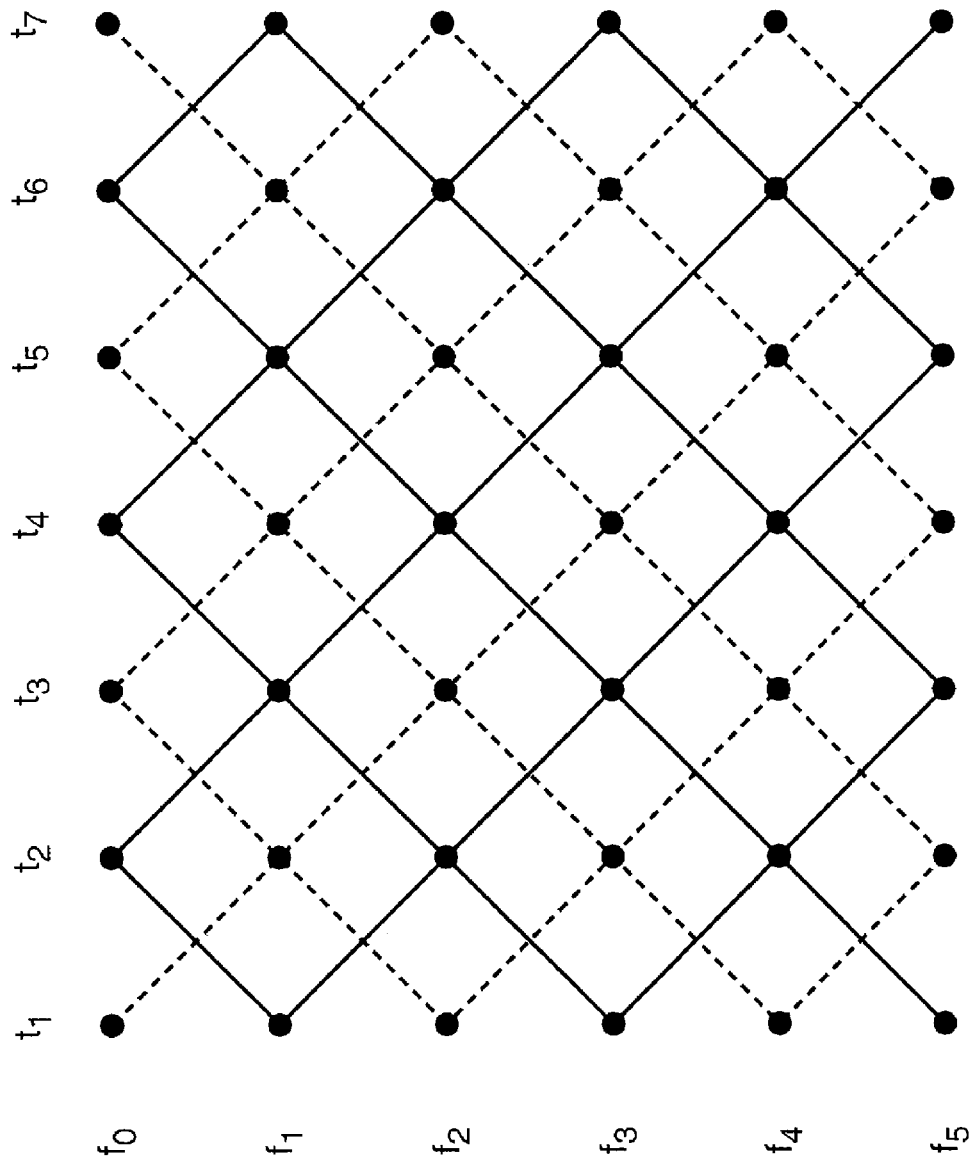
FIG. 9 shows exemplary diagonal ISI in the two-dimensional frequency-time plane.

FIG. 9 illustrates only (1, 1) diagonal ISI in the frequency/time plane. It may be seen that the coupling may be partitioned into two lattices, denoted by the dashed and solid lines, respectively. The direction of the ISI is bi-directional along each line of the lattice between the two symbol points it joins. Furthermore, because the diagonal ISI coupling coefficients are real when the exemplary pulse-shaping filter of FIG. 2 is used, even when the symbols are complex, as with QPSK symbols, real parts of one symbol only affect real parts of other symbols, so each of the solid and dashed lattices may be further partitioned into Real and Imaginary lattices. Thus, an MLSE equalizer that solves any one of the Real & solid, Real & dashed, Imaginary & solid, or Imaginary & dashed lattices may be applied separately to all four lattices to resolve the symbols.

Figure 10:
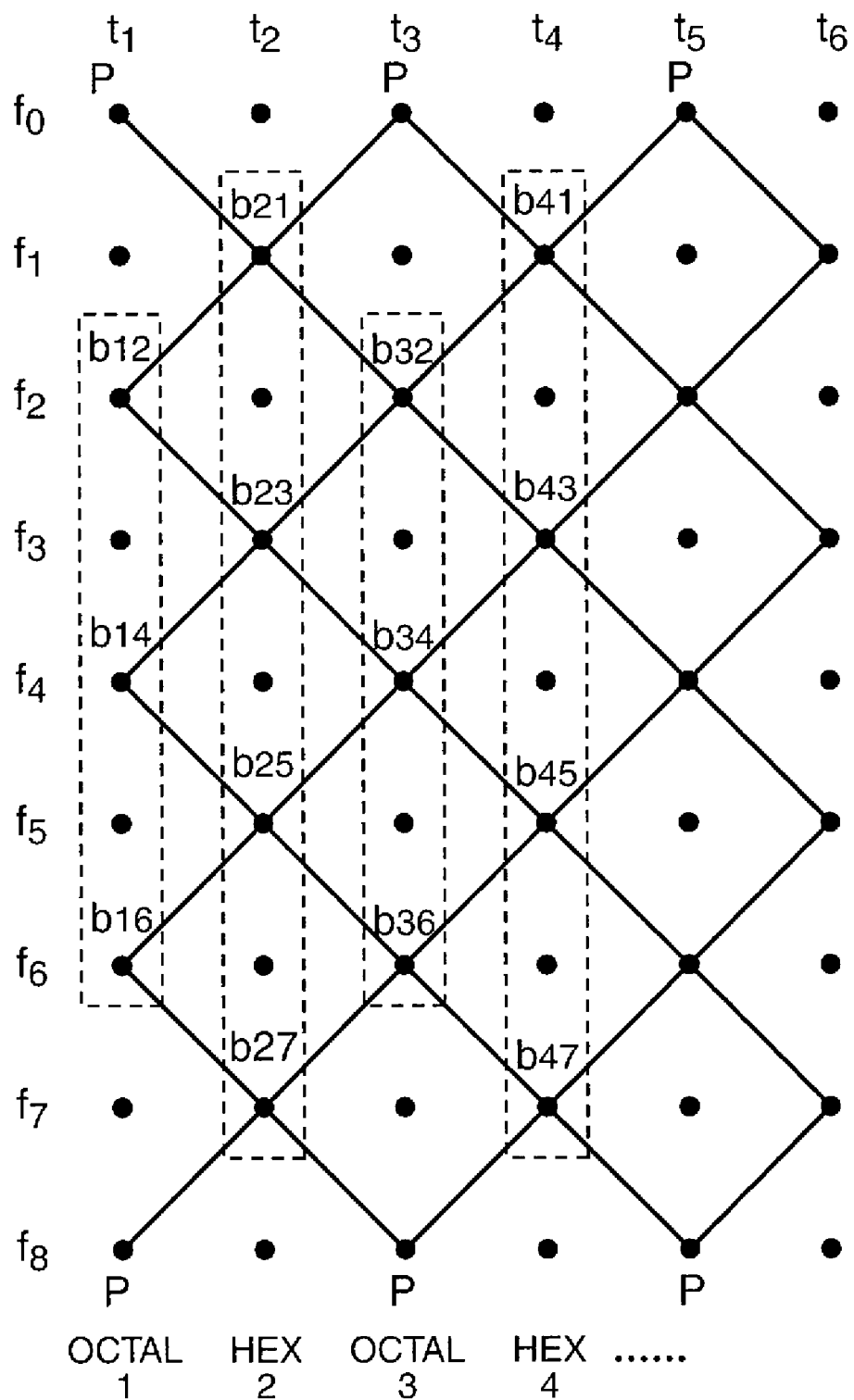
FIG. 10 shows exemplary diagonal ISI between real parts of received symbols in the two-dimensional frequency-time plane.

Now suppose that every eighth symbol along the frequency dimension is a known pilot symbol used for channel estimation. FIG. 10 shows a section of the Real and solid lattice extracted from FIG. 9 that would be contained between two rows of pilot symbols. Although the pilot symbols are spaced by eight symbols, due to each lattice comprising only every alternate symbol, there are only three or four symbols in the lattice of interest between two pilot symbols. Moreover, due to being able to partition the lattice into real and imaginary parts, the symbols in the Real and solid lattice of FIG. 10 are all real, e.g., binary bits. The group of three binary bits indexed b12, b14, and b16 may be considered to form a single octal symbol, denoted by O1. Likewise the bits indexed b31, b33, b35, and b37 in the adjacent column may be considered to form a hexadecimal symbol, denoted H2, and so forth. Thus, the lattice may be described in terms of alternating between Octal and Hexadecimal symbols. In terms of these symbols, the vector of received symbols in column $t_2$, for example, may be expressed as:

$$R(f_1,f_3,f_5,f_7;t_2)=G1(O1)+G2(H2)+G3(O3), \quad (10)$$

where the functions G1, G2, G3 may comprise pre-computed look-up tables containing all possible values of their respective one-symbol argument, which is then used as an address. With no inter-channel ISI, G2 would in fact be an identity function, e.g., the unit matrix, apart from weighting by the transmitter-to-receiver propagation channel coefficient. The latter is determined with the aid of the pilot symbols. Because the vector of received symbol samples is a function of three consecutive symbols, a 1-D MLSE algorithm may be used to determine the symbols. Construction of MLSE algorithms is well known in the art. See for example U.S. Pat. No. 5,467,374 (Chennakeshu et al), U.S. Pat. No. 6,347,125 (Dent), U.S. Pat. No. 6,570,910 (Bottomley et al), and U.S. Pat. No. 5,910,182 (Dent et al), which are all hereby incorporated by reference herein.

An MLSE algorithm for sequentially decoding the symbols O1, H2, O3, H4, . . . using Equation (10) may comprise 128 decoder states representing all possible 8×16 combinations of O1 and H2, where each state has an associated cumulative metric and an associated path history comprised of partially-decided symbols earlier than O1, e.g., H0, O(−1) etc. The MSLE algorithm hypothesizes each possible value of O3 in turn in order to predict the vector $R(f_1, \ldots f_7; t_2)$ for each of the 128 states. The predicted vector is compared with the actual received symbol samples, and the sum of the squared error magnitudes of the four components determined as a delta-metric. The delta-metric is added to the cumulative metric for the state to obtain candidate metrics. The best of the 8 candidates that differ only in the symbol O1 that produced them, but that agree in symbols H2 and O3, is selected to be the cumulative metric for a new state associated with H2 and O3. The value of O1 that produced the best metric is shifted into the path history to provide the path history for the new state. Repeating for all hypotheses of O3 generates 128 successor states addressed by (H2, O3) to replace the 128 predecessor states addressed by (O1, H2). The MLSE algorithm then progresses to:

$$R(f_2, f_4, f_6; t_3) = G4(H2) + G5(O3) + G6(H4). \quad (11)$$

The operation is substantially the same as the first described operation, except that now each of the 16 possible values of H4 is hypothesized in turn, and the best of 16 new candidate metrics differing only in the value of H2 that produced them is selected to form a successor state. Again, 128 successor states are produced, addressed now by symbols (O3, H4). Partially decoded symbols (O1, H2) and earlier now lie in the path histories associated with each state. A symbol is fully decoded when all versions of it in all 128 path histories agree. Other means to deem a symbol to be fully decoded may also be used. For example, the MLSE algorithm may allow the path history to grow only to a limited length, e.g., say 4-32 symbols, called the "decision depth," before selecting the oldest symbol from the path history having the smallest associated cumulative metric.

The MLSE algorithm may be simplified when the transmitter 110 at least partially pre-compensates for the diagonal ISI. For example, transmit pre-compensation may be used to cancel forward diagonal ISI. It was earlier described how transmit pre-compensation could be used to compensate for reverse diagonal ISI to allow the receiver 120 to only compensate for forward ISI using DFE. However, in contrast to DFE, an MLSE algorithm may just as easily compensate for reverse diagonal ISI, thus allowing the transmitter 110 to pre-compensate for forward ISI, which is easier because it only uses already transmitted symbols combined with new symbols according to:

$$T_k(z) = S_k(z) - A(z+1/z) T_{k-1}(z). \quad (12)$$

When the transmitter 110 pre-compensates for forward diagonal ISI using Equation (12), the receiver 120 receives:

$$R(z, Z) = S(z, Z)\left[1 + \frac{AZ(z+1/z)}{1 + AZ(z+1/z)}\right]. \quad (13)$$

Equation (13) may be expanded to:

$$R(z,Z) = S(z,Z)[1 + AZ(z+1/z) - A^2(z+1/z)^2 + A^3 Z^{-1}(z+1/z)^3 \ldots], \quad (14)$$

When $A = -0.17391$, the cubic term is over 45 dB down from the other terms. The squared term involves the current symbol and two others spaced two away in frequency at the same time. However, these symbols are in the same lattice, and therefore do not cause coupling between the dashed and solid lattices. The square term is also 30 dB down from the other terms, and therefore is not a performance driver. Thus, the received signal vector may be expressed as a function only of the two symbols H2 and O3 as shown in Equation (15).

$$R(f_1, f_3, f_5, f_7; t_2) = G2(H2) + G3(O3) \quad (15)$$

An MLSE process to decode successive symbols H2, O3, H4, O5 . . . now involves alternating between sixteen states, addressed by a hexadecimal symbol, and eight states addressed by an octal symbol, and is therefore between eight and sixteen times simpler than when no transmit pre-compensation is employed. The penalty is that the transmitter 110 transmits 0.28 dB more power when it transmits such pre-compensated signals, but this is still a further improvement over the methods previously discussed herein, apart from the 128-state MLSE process, which is substantially without loss.

Other forms of transmit pre-compensation may be devised to facilitate the use of an MLSE receiver 120. MLSE is facilitated if it decodes along a single dimension, as was achieved above by bounding the spread in the frequency dimension with pilot symbols. Another method to permit 1-D MLSE decoding is to use transmit pre-compensation to eliminate ISI along one set of diagonal lines while leaving the receiver 120 to compensate along the other diagonals using MLSE.

Figure 11:
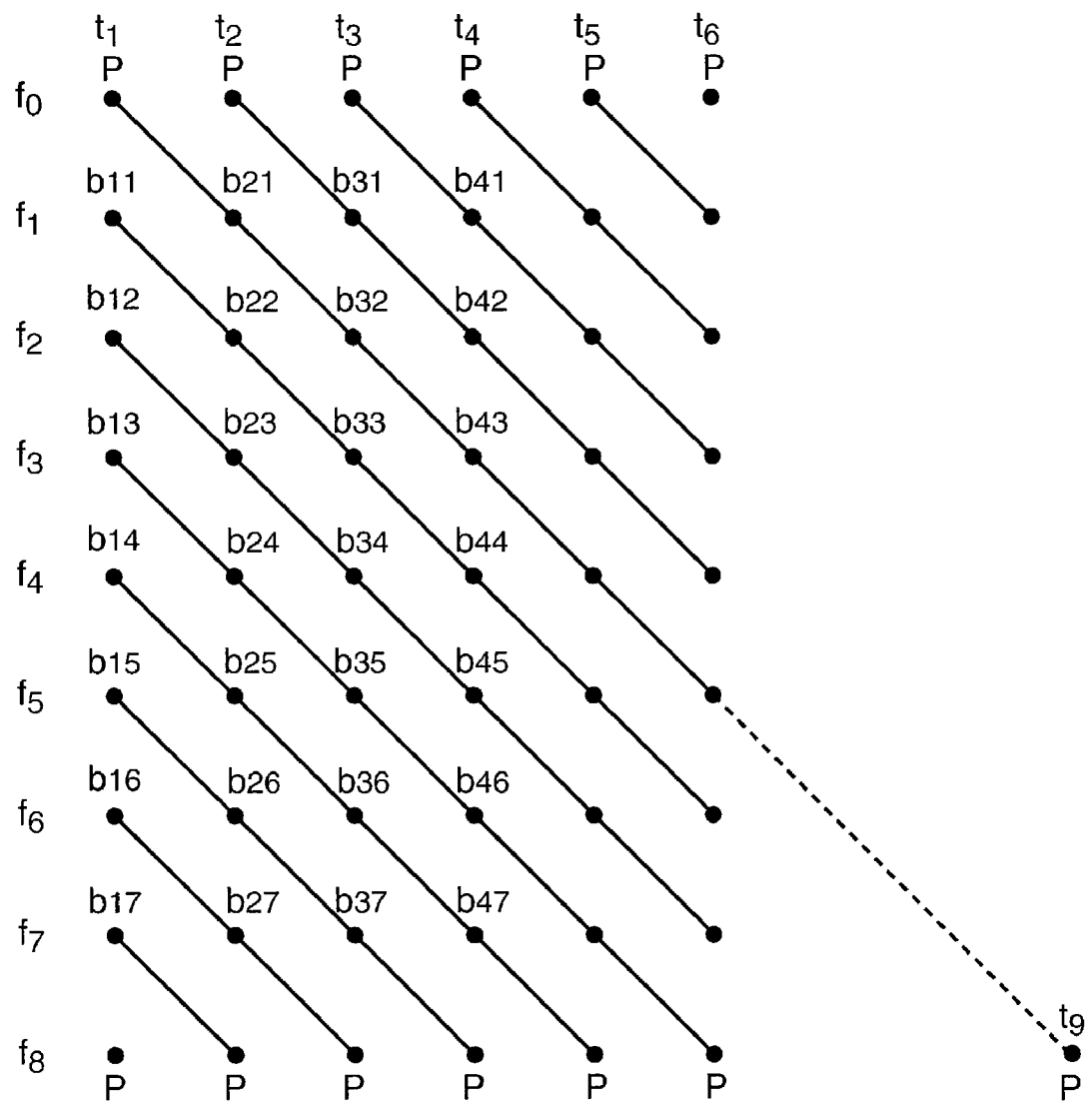
FIG. 11 shows the residual diagonal ISI in the two-dimensional frequency-time plane remaining after partial transmit pre-compensation.

FIG. 11 illustrates the diagonals along which ISI remains after transmit pre-compensation. Coupling exists between bits b21, b32, and b43, for example, but not between bits b23, b32, and b41. The latter may be approximately pre-compensated for at the transmitter 110 using:

$$T(z, Z) = \frac{S(z, Z)}{1 + A(Z/z + z/Z)}, \quad (16)$$

which may also be written as:

$$T(z, Z) = \frac{S(z, Z)}{1 + AZ/z} - \frac{AzT(z, Z)}{Z}, \quad (17)$$

as the rightmost term depends only on previously computed T(z,Z) vectors and so is available. As found previously, compensating for two of the four diagonal ISI terms by transmit pre-compensation requires a 0.28 dB increase in transmission power, which is therefore a penalty, albeit small enough to be acceptable. The leftmost term is a simple and stable first order IIR filter that runs backwards in time across a diagonal sequence of symbols, e.g., each successive symbol processed by the filter is one symbol period earlier in time and one sub-carrier frequency higher. Thus, receiver 120 receives samples given by the following exemplary equation:

$$R(f_2,t_3)=g1\cdot b21+g2\cdot b32+g3\cdot b43 \quad (18)$$

and similarly for other points or other diagonals.

Thus, an MLSE algorithm may be constructed with only four states, corresponding to all combinations of bits b21, b32, b43 and transitioning to successor states corresponding to bits b32, b43. In fact, the MLSE algorithm would begin with one state at a pilot symbol, for example at ($f_0,t_1$). It would then expand to two states corresponding to moving along the diagonal to encompass b21. It would then expand to four states to encompass b32, and then remain at four states until contracting to two states upon encountering the pilot at ($f_8,t_9$). At that point, the state with the smallest cumulative metric is chosen, and the diagonal ($f_8,t_9$) to ($f_8,t_9$) is then completely decoded. Other diagonals are decoded in a similar manner. This four-state MLSE algorithm has sufficiently low complexity that the assumption of real ISI, allowing separation of the lattice into Real and Imaginary parts, may be dropped. If instead of decoding bits, QPSK symbols were decoded, the number of states required would be $4^2=16$ instead of $2^2=4$ for binary data. This may be useful if receiver 120 is also expected to compensate for ISI introduced by the propagation channel.

It will be appreciated that the MLSE algorithm applies even when inter-channel and/or inter-block ISI is not pre-compensated for by the pulse shaping element 114 at transmitter 110, and therefore, when inter-channel and/or inter-block ISI is present in the received symbols. In fact, the MLSE algorithm used to compensate for diagonal ISI may also compensate for some inter-block ISI, such as the inter-block ISI present between OFDM symbol blocks separated by an even number of symbol blocks.

Propagation channel effects include Doppler due to relative motion of the transmitter 110 and receiver 120 and multi-path echoes due to reflecting objects. These effects are exactly reversed in their consequences for OFDM as compared to regular single-channel digital data transmission. Multi-path propagation has the effect that symbols along the OFDM frequency axis suffer varying phase shifts and amplitude changes, while Doppler has the effect of introducing ISI along the frequency axis. By contrast, for regular single-channel data transmission, Doppler causes symbols along the time axis to suffer varying phase and amplitude, while multi-path causes ISI between symbols lying along the time axis. Multi-path propagation may be handled as long as the phase and amplitude of each path does not change much from one symbol period $t_i$ to the next $t_{i+1}$. Typically, it is preferable that the propagation channel be relatively stable over the length of the impulse response of FIG. 2, which means that the impulse response length should be no more than 1 ms before it dropped to negligible values. A more elaborate discussion of methods to handle time-varying, multi-path channel effects on OFDM is beyond the intended scope of this disclosure.

Note that for the ISI lattice of FIG. 10, when received sample vectors may be described by Equation (10), ISI along the frequency axis caused by Doppler shift causes coupling between adjacent channels, and therefore between the dashed and solid lattices. If the coupling is small, it may be compensated to some extent by feeding compensating values between the dashed and solid MLSE processes. The same may be said of non-zero ISI coupling along the time axis. This may be compensated to some extent by feeding compensating values across between the dashed and solid lattices. This permits the requirement on the pulse shape (e.g., FIG. 2) to be relaxed from the requirement of zero pure-time or pure-frequency ISI. In general, the teachings herein permit the requirement for zero pure-time and pure-frequency ISI to be relaxed by employing methods similar to those described to compensate the signal for residual ISI. Such relaxation may permit better spectral containment, for example by using a Gaussian pulse shape or a pulse shape which is Nyquist in the time domain and has a root-raised cosine Fourier Transform, but which is not Nyquist in the frequency domain. There may be penalties to pay for such spectral improvements, such as determining that the transmitter 110 has to transmit a higher power due to the use of an ISI pre-compensating filter that compensates for more ISI, but a person skilled in the art may evaluate this using the teachings above to determine if the trade-off is worthwhile for a particular application.

It has been described above how a pulse shaping element 114 for shaping OFDM transmissions to exhibit no ISI between symbols modulated on to the same sub-carrier frequency at different times nor between symbols modulated at the same time on to different sub-carrier frequencies may be combined with means to compensate for ISI between symbols modulated on to different sub-carrier frequencies at different times. It has also been shown that such compensation may be carried out at the receiver 120 alone, at the transmitter 110 alone, or partly at the transmitter 110 and partly at the receiver 120, for which certain advantages have been pointed out. Various forms of compensation have been illustrated, including a partial channel inverse equalizer, DFE, and MLSE. The methods of compensation disclosed are not exhaustive, and others, such as Minimum Mean Square Error, which is similar to a partial channel inverse equalizer, could be proposed and developed by a person skilled in the art using the teachings herein without departing from the scope of the invention as described by the attached claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of compensating for inter-symbol interference (ISI) in a signal transmitted from a transmitter to a receiver, said method comprising:
   pre-compensating orthogonal frequency division multiplexing (OFDM) symbols at the transmitter using a partial channel inverse equalizer formed by at least one of an infinite impulse response filter structure and a finite impulse response filter structure to substantially reduce at least a portion of diagonal ISI in OFDM symbols received at the receiver; and
   transmitting said pre-compensated symbols by pulse-shaped OFDM using a pulse shape chosen to substantially reduce at least one of inter-block and inter-channel ISI in the OFDM symbols received at the receiver.

2. The method of claim 1 wherein transmitting said pre-compensated symbols by pulse-shaped OFDM comprises weighted combining of successive pre-compensated OFDM symbol blocks using a pulse-shaping and weighting function having Nyquist properties in at least one of a time domain and a frequency domain.

3. The method of claim 2 wherein the pulse-shaping and weighting function comprises a square-root of a function having a Nyquist property.

4. The method of claim 2 wherein the pulse-shaping and weighting function is its own Fourier transform.

5. The method of claim 1 wherein pre-compensating the OFDM symbols to reduce at least a portion of the diagonal ISI comprises pre-compensating the OFDM symbols for at least one of forward and reverse components of the diagonal ISI at the transmitter.

6. The method of claim 1 wherein pre-compensating the OFDM symbols for at least a portion of the diagonal ISI comprises pre-compensating the OFDM symbols for a first portion of the diagonal ISI at the transmitter, the method further comprising post-compensating for a remaining portion of the diagonal ISI at the receiver to compensate for the diagonal ISI present in the OFDM symbols received at the receiver.

7. The method of claim 6 wherein post-compensating for the remaining portion of the diagonal ISI comprises post-compensating for the remaining portion of the diagonal ISI at the receiver using one of a partial channel inverse equalizer, a decision feedback equalizer, and a maximum likelihood sequence estimation algorithm.

8. A method of compensating for inter-symbol interference (ISI) in a signal transmitted from a transmitter to a receiver, said method comprising:
pre-compensating orthogonal frequency division multiplexing (OFDM) symbols at the transmitter to substantially reduce at least one of forward and reverse components of diagonal ISI in OFDM symbols received at the receiver by filtering OFDM symbol blocks at the transmitter using a filter; and
transmitting said pre-compensated symbols by pulse-shaped OFDM using a pulse shape chosen to substantially reduce at least one of inter-block and inter-channel ISI in the OFDM symbols received at the receiver;
wherein the filter is defined by one of $1/[1+A(z+1/z)(Z+1/Z)]$, $[1+AZ(z+1/z)]/[1+A(z+1/z)(Z+1/Z)]$, and $[1+AZ^{-1}(z+1/z)]/[1+A(z+1/z)(Z+1/Z)]$, where A represents an ISI coupling factor, z represents a frequency shift operator, and Z represents a time shift operator.

9. A method of compensating for inter-symbol interference (ISI) in a signal transmitted from a transmitter to a receiver, said method comprising:
receiving a signal from said transmitter and developing pulse-shaped orthogonal frequency division multiplexing (OFDM) symbols therefrom to substantially reduce at least one of inter-block and inter-channel ISI in the developed OFDM symbols; and
post-compensating the developed OFDM symbols at the receiver using a partial channel inverse equalizer or using a maximum likelihood sequence estimation algorithm to compensate for at least a portion of diagonal ISI in the developed OFDM symbols.

10. The method of claim 9 wherein post-compensating the developed OFDM symbols comprises post-compensating the developed OFDM symbols to compensate for at least one of forward and reverse components of the diagonal ISI at the receiver.

11. The method of claim 9 further comprising pre-compensating the OFDM symbols at the transmitter to compensate for a first portion of the diagonal ISI, wherein post-compensating the developed OFDM symbols comprises post-compensating the developed OFDM symbols for a remaining portion of the diagonal ISI at the receiver.

12. The method of claim 9 wherein post-compensating the developed OFDM symbols comprises post-compensating the developed OFDM symbols at the receiver using a decision feedback equalizer.

13. The method of claim 9 wherein post-compensating the developed OFDM symbols using the maximum likelihood sequence estimation algorithm comprises:
performing a first decoding on the developed OFDM symbols on alternating sub-carrier frequency channels in the same OFDM block, and on the developed OFDM symbols on a common sub-carrier frequency channel in alternating OFDM blocks; and
performing a second decoding on the remaining OFDM symbols.

14. The method of claim 9 wherein post-compensating the developed OFDM symbols using the maximum likelihood sequence estimation algorithm comprises:
implementing a first maximum likelihood sequence estimation on real parts of the developed OFDM symbols; and
implementing a second maximum likelihood sequence estimation on imaginary parts of the developed OFDM symbols.

15. The method of claim 9 wherein the received signal comprises a pulse-shaped OFDM signal generated at the transmitter using a first pulse-shaping and weighting function and transmitted to the receiver.

16. The method of claim 15 wherein developing the OFDM symbols comprises applying a second pulse-shaping and weighting function to the received signal.

17. The method of claim 16 wherein the first and second pulse-shaping and weighting functions operating together comprise a weighting function having Nyquist properties in at least one of a time domain and a frequency domain.

18. The method of claim 17 wherein the first and second pulse-shaping and weighting functions are each the square-root of a function having Nyquist properties.

19. A method of compensating for inter-symbol interference (ISI) in a signal transmitted from a transmitter to a receiver, said method comprising:
receiving a signal from said transmitter and developing pulse-shaped orthogonal frequency division multiplexing (OFDM) symbols therefrom to substantially reduce at least one of inter-block and inter-channel ISI in the developed OFDM symbols; and
post-compensating the developed OFDM symbols at the receiver to compensate for at least one of forward and reverse components of the diagonal ISI by filtering the developed OFDM symbol blocks at the receiver using a filter;
wherein the filter is defined by one of $1/[1+A(z+1/z)(Z+1/Z)]$, $[1+AZ^{-1}(z+1/z)]/[1+A(z+1/z)(Z+1/Z)]$, and $[1+AZ^{-1}(z+1/z)]/[1+A(z+1/z)(Z+1/Z)]$, where A represents an ISI coupling factor, z represents a frequency shift operator, and Z represents a time shift operator.

20. A transmitter for compensating for inter-symbol interference (ISI) in a signal transmitted to a receiver, said transmitter comprising:
a pre-compensation element configured to pre-compensate orthogonal frequency division multiplexing (OFDM) symbols at the transmitter to compensate for at least a portion of diagonal ISI in OFDM symbols received at the receiver;
a pulse-shaping element configured to generate pulse-shaped OFDM symbols to substantially reduce at least one of inter-block and inter-channel ISI in the pre-compensated OFDM symbols received at the receiver; and
transmission elements to transmit said pulse-shaped OFDM symbols;
wherein the pre-compensation element comprises a partial channel inverse equalizer formed using at least one of an infinite impulse response filter structure and a finite impulse response filter structure.

21. The transmitter of claim 20 wherein the pulse-shaping element combines successive pre-compensated OFDM symbol blocks using a pulse-shaping and weighting function having Nyquist properties in at least one of a time domain and a frequency domain to reduce at least one of inter-block ISI and inter-channel ISI.

22. The transmitter of claim 21 wherein the pulse-shaping and weighting function comprises a square root of a function having a Nyquist property.

23. The transmitter of claim 22 wherein the pulse-shaping and weighting function is its own Fourier transform.

24. The transmitter of claim 20 wherein the pre-compensation element compensates for at least one of forward and reverse components of the diagonal ISI.

25. A transmitter for compensating for inter-symbol interference (ISI) in a signal transmitted to a receiver, said transmitter comprising:
  a pre-compensation element configured to pre-compensate orthogonal frequency division multiplexing (OFDM) symbols at the transmitter to compensate for at least one of forward and reverse diagonal ISI in the OFDM symbols received at the receiver by filtering OFDM symbol blocks using a filter;
  a pulse-shaping element configured to generate pulse-shaped OFDM symbols to substantially reduce at least one of inter-block and inter-channel ISI in the pre-compensated OFDM symbols received at the receiver; and
  transmission elements to transmit said pulse-shaped OFDM symbols;
wherein the filter is defined by one of $1/[1+A(z+1/z)(Z+1/Z)]$, $[1+AZ(z+1/z)]/[1+A(z+1/z)(Z+1/Z)]$, and $[1+AZ^{-1}(z+1/z)]/[1+A(z+1/z)(Z+1/Z)]$, where A represents an ISI coupling factor, z represents a frequency shift operator, and Z represents a time shift operator.

26. A receiver for compensating for inter-symbol interference (ISI) in a signal transmitted by a transmitter, said receiver comprising:
  reception elements to receive said signal from said transmitter;
  a matched filter to develop block pulse-matched orthogonal frequency division multiplexing (OFDM) symbol blocks from the received signal to reduce at least one of inter-block and inter-channel ISI in the developed OFDM symbol blocks; and
  a post-compensation element to compensate for at least a portion of the diagonal ISI from the developed OFDM symbols;
  wherein the post-compensation element is configured to implement either a partial channel inverse equalizer or a maximum likelihood sequence estimation algorithm.

27. The receiver of claim 26 wherein the post-compensation element compensates for at least one of forward and reverse components of the diagonal ISI.

28. The receiver of claim 26 wherein the post-compensation element comprises a decision feedback equalizer.

29. The receiver of claim 26 wherein the maximum likelihood sequence estimation algorithm is configured to:
  perform a first decoding on the developed OFDM symbols on alternating sub-carrier frequency channels in the same OFDM block, and on the developed OFDM symbols on a common sub-carrier frequency channel in alternating OFDM blocks; and
  perform a second decoding on the remaining OFDM symbols.

30. The receiver of claim 26 wherein the maximum likelihood sequence estimation algorithm is configured to:
  implement a first maximum likelihood sequence estimation on real parts of the developed OFDM symbols; and
  implement a second maximum likelihood sequence estimation on imaginary parts of the developed OFDM symbols.

31. A receiver for compensating for inter-symbol interference (ISI) in a signal transmitted by a transmitter, said receiver comprising:
  reception elements to receive said signal from said transmitter;
  a matched filter to develop block pulse-matched orthogonal frequency division multiplexing (OFDM) symbol blocks from the received signal to reduce at least one of inter-block and inter-channel ISI in the developed OFDM symbol blocks; and
  a post-compensation element to compensate for at least one of forward and reverse components of the diagonal ISI by filtering the received OFDM symbols using a filter;
wherein the filter is defined by one of $1/[1+A(z+1/z)(Z+1/Z)]$, $[1+AZ(z+1/z)]/[1+A(z+1/z)(Z+1/Z)]$, and $[1+AZ^{-1}(z+1/z)]/[1+A(z+1/z)(Z+1/Z)]$, where A represents an ISI coupling factor, z represents a frequency shift operator, and Z represents a time shift operator.

* * * * *

UNITED STATES PATENT AND TRADEMARK OFFICE
CERTIFICATE OF CORRECTION

PATENT NO. : 8,345,793 B2
APPLICATION NO. : 12/045157
DATED : January 1, 2013
INVENTOR(S) : Dent It is certified that error appears in the above-identified patent and that said Letters Patent is hereby corrected as shown below:

In Column 3, Line 9, delete "IS." and insert -- ISI. --, therefor.

In Column 9, Line 61, delete "SI." and insert -- ISI. --, therefor.

In Column 15, Line 16, after "diagonal", delete the first occurrence of "$(f_g, t_9)$" and insert -- "$(f_0, t_1)$" --, therefor.

In Column 18, Line 48, in Claim 19, delete "$[1+AZ^{-1}(z+1/z)]/[1+A(z+1/z)(Z+1/Z)]$," and insert -- $[1+AZ(z+1/z)]/[1+A(z+1/z)(Z+1/Z)]$, --, therefor.

Signed and Sealed this
Ninth Day of April, 2013

Teresa Stanek Rea
*Acting Director of the United States Patent and Trademark Office*